United States Patent
Bohaychuk

(10) Patent No.: US 9,458,941 B2
(45) Date of Patent: Oct. 4, 2016

(54) ROTARY STEPPING ACTUATOR FOR VALVE

(71) Applicant: Master Flo Valve Inc., Edmonton (CA)

(72) Inventor: Larry J. Bohaychuk, Ardrossan (CA)

(73) Assignee: Master Flo Valve Inc., Edmonton (CA)

( * ) Notice: Subject to any disclaimer, the term of this patent is extended or adjusted under 35 U.S.C. 154(b) by 0 days.

(21) Appl. No.: 14/702,383

(22) Filed: May 1, 2015

(65) Prior Publication Data

US 2015/0316169 A1 Nov. 5, 2015

Related U.S. Application Data

(60) Provisional application No. 61/988,036, filed on May 2, 2014.

(51) Int. Cl.

| F16K 31/12 | (2006.01) |
|---|---|
| F16K 3/24 | (2006.01) |
| E21B 34/02 | (2006.01) |
| F16H 31/00 | (2006.01) |
| F16K 31/04 | (2006.01) |

(52) U.S. Cl.
CPC .............. *F16K 3/246* (2013.01); *E21B 34/02* (2013.01); *F16H 31/001* (2013.01); *F16H 31/003* (2013.01); *F16K 31/047* (2013.01); *F16K 31/12* (2013.01)

(58) Field of Classification Search
CPC ...... F16K 3/246; F16K 31/047; F16K 31/12; F16H 31/001; F16H 31/003; E21B 34/02
USPC .................................. 251/58, 120, 118, 121
See application file for complete search history.

(56) References Cited

U.S. PATENT DOCUMENTS

| 4,180,238 A | 12/1979 | Muchow |
|---|---|---|
| 4,403,523 A | 9/1983 | Seger |

(Continued)

OTHER PUBLICATIONS

International Search Report with Written Opinion corresponding to International Search Report No. PCT/CA2015/000278, mailed Jul. 23, 2015.

*Primary Examiner* — Craig Schneider
*Assistant Examiner* — Andrew J Rost
(74) *Attorney, Agent, or Firm* — Lathrop & Gage LLP

(57) ABSTRACT

Valve system with rotary stepping actuator to actuate a valve stem. An actuator drive shaft is supported for stepwise rotation in clockwise and counterclockwise directions to impart rotation to a valve stem nut to axially move a valve stem to open and close valve flow trim. The drive shaft forms peripheral first and second slotted circular drive paths co-axially spaced from each other. The drive paths include outwardly-opening, circumferentially-spaced slots which are matched in number, size and spacing, but the slots in the first drive path are rotationally offset from the slots in the second drive path by a set fraction, for example one half of the slot spacing. Actuation assemblies provide separate forward and reverse actuation cycles to the drive shaft to incrementally rotate the drive shaft in predetermined angular increments (steps) set by the slot spacing. Due to the offset, a counter step in a direction counter to the direction of a directly preceding step rotates the drive shaft by an amount less than the predetermined angular increment, as determined by the set fraction. If the set fraction is one half, the counter step rotates the drive shaft by a half step, while the next following step in the same counter direction is a full step in the predetermined angular increment.

29 Claims, 8 Drawing Sheets

(56) References Cited

U.S. PATENT DOCUMENTS

| | | |
|---|---|---|
| 4,534,235 A | 8/1985 | Mitcham et al. |
| 4,540,022 A | 9/1985 | Cove |
| 4,541,295 A | 9/1985 | Cove |
| 4,570,724 A | 2/1986 | Robinson |
| 4,771,807 A | 9/1988 | Karani |
| 5,431,188 A | 7/1995 | Cove |
| 5,549,013 A | 8/1996 | Kimbara |
| 5,577,436 A | 11/1996 | Kimbara |
| 6,782,949 B2 | 8/2004 | Cove et al. |
| 6,988,554 B2 | 1/2006 | Bodine et al. |
| 7,237,472 B2 | 7/2007 | Cove |
| 7,287,739 B2 | 10/2007 | Arnison et al. |
| 7,426,938 B2 | 9/2008 | Bohaychuk et al. |
| 8,261,625 B2 | 9/2012 | Picerno et al. |
| 8,371,333 B2 | 2/2013 | Bohaychuk |
| 8,402,996 B2 | 3/2013 | Piwonka |
| 8,803,388 B2 | 8/2014 | Keefover et al. |
| 2009/0160275 A1 | 6/2009 | Keefover et al. |
| 2013/0256570 A1 | 10/2013 | McHugh et al. |

SECTION B-B

SECTION B-B

ROTARY STEPPING ACTUATOR FOR VALVE

CROSS REFERENCE TO RELATED APPLICATIONS

This application is a U.S. Nonprovisional application filed under 35 U.S.C. §111(a) which claims the benefit of U.S. Application No. 61/988,036, filed May 2, 2014. This application is hereby incorporated by reference in its entirety.

FIELD OF THE INVENTION

This invention relates to a rotary stepping actuator for a valve, a method for stepwise opening and closing a valve with a rotary stepping actuator and a valve system with a rotary stepping actuator.

BACKGROUND

A choke valve is a particular type of valve commonly used as part of an oil or gas field wellhead. It functions to throttle and reduce the pressure of the fluid flowing through the valve. Choke valves are placed on the production "tree" of an oil or gas wellhead assembly to control the flow of produced fluid from a reservoir into the production flow line. They are used on wellheads located on land (surface) and offshore (platform), as well as on wellheads located beneath the surface of the ocean (subsea). Choke valves common to oil and gas field use are generally described in U.S. Pat. No. 4,540,022, issued Sep. 10, 1985, to Cove and U.S. Pat. No. 5,431,188, issued Jul. 11, 1995 to Cove. A subsea choke valve equipped with pressure transmitters is described in U.S. Pat. No. 6,782,949, issued Aug. 31, 2004 to Cove et al. All of these patents are assigned to Master Flo Valve, Inc. (Master Flo), the owner of this application.

In general, choke valves include:

a valve body having an axial bore, a body inlet (typically oriented as a side inlet to the axial bore) and a body outlet (typically referred to as an bottom or end outlet, aligned with the axial bore);

a "flow trim" mounted in the bore between inlet and outlet, for throttling the fluid flow moving through the body; and means including a stem and bonnet assembly for actuating the flow trim to open and close the choke valve, and for closing the upper end of the axial bore remote from the outlet.

There are four main types of flow trim commonly used in commercial chokes, each of which includes a port-defining member forming one or more flow ports, a movable member for throttling the flow ports, and seal means for implementing a total shut-off. These four types of flow trim can be characterized as follows:

(1) a needle and seat flow trim comprising a tapered annular seat fixed in the valve body and a movable tapered internal plug for throttling and sealing in conjunction with the seat surface;

(2) a cage with internal plug flow trim, comprising a tubular, cylindrical cage, fixed in the valve body and having ports in its side wall, and a plug movable axially through the bore of the cage to open or close the ports. Shut-off is generally accomplished with a taper on the leading edge of the plug, which seats on a taper carried by the cage or body downstream of the ports;

(3) a multiple-port disc flow trim, having a fixed ported disc mounted in the valve body and a rotatable ported disc, contiguous therewith, that can be turned to cause the two sets of ports to move into or out of register, for throttling and shut-off; and (4) a cage with external sleeve flow trim, comprising a tubular cylindrical cage having ports in its side wall and a hollow cylindrical external sleeve (also termed external flow collar) that slides axially over the cage to open and close the ports. The shut-off is accomplished with the leading edge of the sleeve contacting an annular seat carried by the valve body or cage.

In the above choke valves, the flow trim is positioned within the choke valve at the intersection of the inlet and outlet. Commonly, the flow trim includes a stationary tubular cylinder referred to as a "cage", positioned transverse to the inlet and having its bore axially aligned with the outlet. The cage has one or more restrictive flow ports extending through its sidewall. Fluid enters the cage from the choke valve inlet, passes through the flow ports and changes direction to leave the cage bore through the valve outlet.

Maintenance on the deep subsea wellhead assemblies cannot be performed manually. An unmanned, remotely operated vehicle (ROV), is used to approach the wellhead and carry out maintenance functions. To aid in servicing subsea choke valves, choke valves have their internal components, including the flow trim, assembled into a modular sub-assembly. The sub-assembly is referred to as an "insert assembly" and is inserted into the choke valve body and clamped into position.

When the flow trim becomes worn beyond its useful service life due to erosion and corrosion caused by particles and corrosive agents in the produced substances, an ROV is used to approach the choke valve, unclamp the insert assembly from the choke valve body and attach a cable to the insert assembly so that it may be raised to the surface for replacement or repair. The ROV then installs a new insert assembly and clamps it into position. This procedure eliminates the need to raise the whole wellhead assembly to the surface to service a worn choke valve.

In order to efficiently produce a reservoir, it is necessary to monitor the flow rate of the production fluid. This is done to ensure that damage to the formation does not occur and to ensure that well production is maximized. This process has been, historically, accomplished through the installation of pressure and temperature transmitters into the flow lines upstream and downstream of the choke valve. The sensor information is then sent to a remote location for monitoring, so that a choke valve controller can remotely bias the flow trim to affect the desired flow rate. The controller sends electrical signals to actuator means, associated with the choke valve, for adjusting the flow trim.

Fine control over the position of the flow trim is desired. Choke valves are equipped with a means to provide position control. In the most fundamental form, manual operation by a lever or hand wheel is used. To provide remote control of a choke valve's position a variety of actuators, including hydraulic rotary stepping actuators, can be used.

U.S. Pat. No. 6,988,554 issued Jan. 24, 2006 to Bodine et al., describes known hydraulic actuator control systems for the environment of subsea choke valves, noting that it is common for more than one well to be produced through a single flow line, with products from each individual well flow being combined into a common flow line to carry the products to the surface or to combine those products with the products of other flow lines. This patent indicates a difficulty in managing a multiple well completion produced through a single flow line is that not all of the wells may be producing at the same pressure conditions or include the same flow constituents (liquids and gases). Thus, if one well is producing at a lower pressure than the pressure maintained in the flow line, fluid can back flow from the flow line into that well. The loss of production fluids is undesirable, and the pressure changes and reverse flow conditions within that well can damage the well and/or reservoir. Similarly, if one well is producing at a pressure above the flow line pressure, that well may produce at an undesirable flow rate and pressure, again with the potential to damage other wells and/or the reservoir. Thus, management of flow rates and pressures is of critical importance in maximizing the production of hydrocarbons from the reservoir.

In a typical prior art subsea production system, control signals and a hydraulic fluid supply are transmitted along an umbilical from a topside control system to a subsea control module which supplies hydraulic fluid to actuators in the subsea trees. As control valves within the control module receive signals to open or close the choke, the control valves actuate to control the flow of hydraulic fluid to the choke actuator through separate hydraulic lines for opening or closing the choke. A common choke actuator is a hydraulic stepping actuator, which may, for example, take 100 to 200 steps to close. For each step the actuator receives a pulse of hydraulic pressure, which moves the actuator, followed by a release of that pressure, which allows a spring to return the actuator to its initial position. In typical systems, the SCM (subsea control module) is located proximate (e.g., within about 30 feet) to the choke/actuator, and about one second is required for the pressure pulse to travel from the control valve in SCM to the actuator and two seconds are required for the spring to return the actuator to its initial position. With a total of three seconds per step and a total of up to 200 or more steps needed to fully actuate the choke, the time required to fully close or open the choke is considerable. The risk of equipment failure is also increased due to the high frequency of the components being actuated.

Hydraulic or pneumatic stepping actuators commonly used in choke actuation convert the linear motion from hydraulic or pneumatic actuation into rotational motion imparted to an externally threaded stem of the flow trim to open or close the flow trim. These cylinders move linearly in response to a pressurized fluid to stepwise drive actuation components then return to their initial positions using a biasing spring. Thus, each pressure pulse from a directional control valve rotates the choke actuator a certain increment causing linear (i.e., translational), axial adjustment of the flow trim in the choke insert.

Early versions of prior art bi-directional rotary stepping actuators adapted for use with a choke valves are described in U.S. Pat. No. 4,180,238, issued Dec. 25, 1979 to Muchow, and U.S. Pat. No. 4,541,295, issued Sep. 17, 1985 to Cove. The patents describes rotary bi-directional valve actuators including a pair of cranks and ratchet pawls to couple and disengage with one or more ratchet wheels fixed to a stem nut to impart stepwise rotation motion in a clockwise or counterclockwise direction to the stem nut, which in turn moves the valve stem to close or open the valve trim. Hydraulic cylinders are used to drive the dual ratchet mechanisms in opposite directions.

FIGS. 1-3, described below in greater detail, show an embodiment of a Master Flo prior art subsea rotary stepping actuator connected through the stem bonnet assembly to a valve body of a subsea choke. As with the above-mentioned rotary stepping actuators, the angular increments imparted to a stem nut are matched in the clockwise and counterclockwise directions of rotation, and the translational movement imparted to the valve trim with each step is also the same in the opening and closing direction. Thus fine control over the position of the flow trim is set by the angular increments imparted to the stem nut. While fine control can be somewhat addressed by increasing the number of angular increments (steps) needed to open and close the valve, as noted above, for most valves the number of steps to fully open or close the valve is in the order of 100-200 steps, so further increasing the number of steps significantly increases the time needed to open and close the choke valve.

SUMMARY

In one embodiment, there is provided a valve system, including:

(i) a valve body configured with an inlet and an outlet and having flow trim configured to be moved axially by an externally threaded valve stem between a closed position, wherein flow through the valve body is restricted, and an open position, wherein fluid may enter the valve body through the inlet, pass through the flow trim at reduced pressure, and continue through the outlet;

(ii) a stem/bonnet assembly connected to the valve body and including a bonnet disengagably connected with, and closing an upper end of the valve body, the threaded valve stem extending through the bonnet, and a stem nut coaxial with the threaded valve stem and having internal threads cooperatively engaged with the externally threaded valve stem;

(iii) an actuator housing coupled to the stem/bonnet assembly and forming an entry port for sealed entry and rotational mounting of the stem nut;

(iv) an actuator drive shaft supported in the actuator housing for stepwise rotation in clockwise and counterclockwise directions, the drive shaft being co-axially aligned with, and configured to be rotatably coupled directly or indirectly to, the stem nut to impart rotation to the stem nut, the drive shaft forming at a periphery a first circular drive path and a second circular drive path co-axially spaced from the first drive path, each of the first and second drive paths comprising a number of outwardly-opening, circumferentially-spaced openings, the openings in the first and second drive paths being matched in number, size and spacing, and the openings in the first drive path being rotationally offset from the openings in the second drive path, based on midpoint to midpoint spacing of the openings, by a set fraction of the opening spacing;

(v) a first actuation assembly mounted in the actuator housing adjacent the first drive path of the drive shaft and moveable from a retracted position through a forward actuation cycle, and operative to releasably engage one of the openings in the first drive path to incrementally rotate the drive shaft in a forward step through a predetermined angular increment set by the opening spacing in the counterclockwise direction when moved through the forward actuation cycle;

(vi) a second actuation assembly mounted in the actuator housing adjacent the second drive path of the drive shaft and moveable from a retracted position through a reverse actuation cycle, and operative to releasably engage one of the openings in the second drive path to incrementally rotate the drive shaft in a reverse step through the predetermined angular increment in the clockwise direction when moved through the reverse actuation cycle;

(vii) an actuation control system coupled with the actuator housing and configured to supply a discrete quantity of pressurized fluid to stepwise and separately drive the first and second actuation assemblies to impart stepwise counterclockwise and clockwise rotational movement to the drive shaft in the forward and reverse actuation cycles to move the flow trim in the forward and reverse steps between the open and closed positions; and (viii) the drive shaft and the first and second actuation assemblies being adapted to incrementally rotate the drive shaft in a counter step in a direction counter to the direction of a directly preceding step by an amount less than the predetermined angular increment, said amount being determined by the set fraction of the offset, such that the counter step in the counter direction rotates the drive shaft by said amount determined by the set fraction, while a next step in the same counter direction is a full step in the predetermined angular increment.

In some embodiments, the drive shaft and the first and second actuation assemblies are adapted to delay engaging the opening in the first and second drive paths in the counter step, i.e., the first forward step and the first reverse step directly following the previous reverse step or the previous forward step respectively, by the set fraction. The amount determined by the set fraction for the counter step, in some embodiments, is one minus the set fraction.

In some embodiments, the openings are slots extending axially along the rotational axis.

In some embodiments, the set fraction is about one half of the slot spacing, such that the counter step rotates the drive shaft by said amount which is about one half of the predetermined angular increment set by the slot spacing such that the counter step is a half step.

In some embodiments, the number of slots in each of the first and second drive paths is between 5 and 20 so that the predetermined angular increments imparted in the full forward step and the full reverse step is between about 18 and 72° and the offset results in the half step being between about 9 and 36°.

In some embodiments the number of slots in each of the first and second drive paths is 10 so that the predetermined angular increment imparted in each of the full forward and full reverse steps is about 36° and the offset results in the half step being between about 18°. Thus, finer control of the position of the flow trim is possible, compared to a valve operated without the slot offset in the drive shaft. Opening the valve through stepwise angular increments of the 36° to a full open or a partially opened position can be followed by a first closing step (a counter step) in the reverse direction, which although being the same 36° angular increment, due to the offset, results in imparting only a half step (18°) of reverse movement to the drive shaft, thus imparting only a half step of axial movement in the closing direction to the valve stem of the flow trim. Further steps in the closing direction (same counter direction) impart the full predetermined angular increment of 36° for each step. Thus, while the first half step (counter step) in the closing direction provides fine control over the flow trim position, the time to close the valve from the full open or partially opened positions remains virtually unchanged compared to the prior art rotary stepping actuators in which the drive shaft slots are co-axially and rotationally aligned.

Also provided as actuation components for a valve are the drive shaft as defined above, and a rotary stepping actuator including the components (iii)-(viii) as above.

Also provided is a method of opening and closing the flow trim of a valve with a rotary stepping actuator by imparting stepwise rotation in predetermined angular increments in clockwise and counterclockwise directions to a drive shaft rotationally coupled to the flow trim through a stem nut and a valve stem in a manner to impart axial movement to the flow trim with each stepwise rotation of the drive shaft. The method includes:

supplying pressurized fluid to stepwise and separately drive first and second actuation assemblies to impart stepwise counterclockwise and clockwise rotational movement to the drive shaft such that the drive shaft is stepwise rotated by a predetermined angular increment for each forward step and each reverse step to move the flow trim axially in steps between an open position and a closed position;

incrementally rotating the drive shaft in a counter step in a direction counter to the direction of a directly preceding forward or reverse step by an amount less than the predetermined angular increment; and incrementally rotating the drive shaft in a next step in the same counter direction by the predetermined angular increment.

As above, in some embodiments the method provides that the counter step incrementally rotates the drive shaft by about half of the predetermined angular increment.

DETAILED DESCRIPTION

Figure 1:
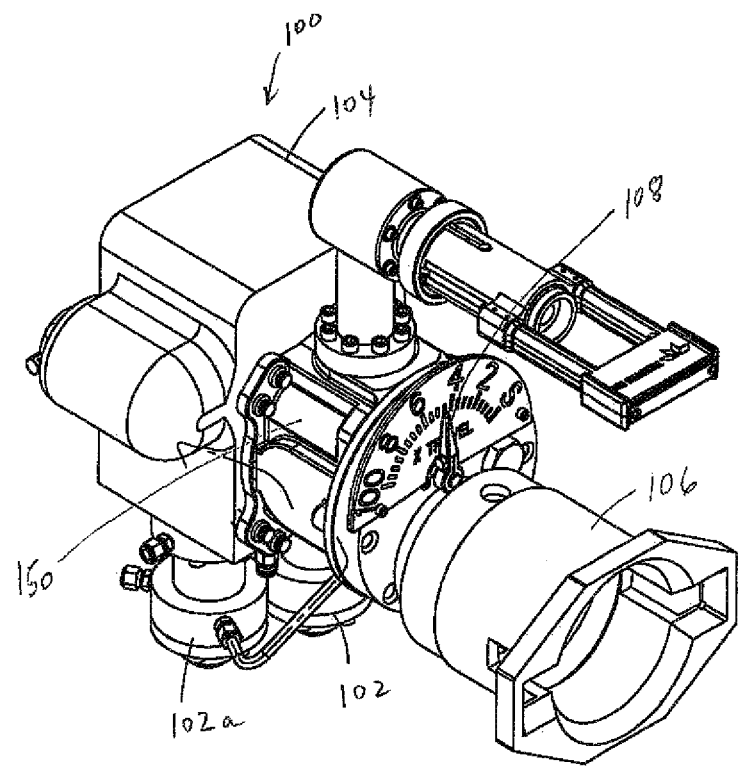
FIG. 1 is a top perspective view of a Master Flo prior art subsea rotary stepping actuator shown separate from a choke valve.

A rotary stepping actuator is described herein in one embodiment, adapted for connection to a Master Flo prior art subsea choke valve of an external sleeve internal cage design. In this embodiment the rotary stepping actuator functions to convert linear movement from one or more hydraulic cylinder pistons into a rotational stepping motion in fixed angular increments to the a stem nut, which in turn is imparted for translational or axial movement of a threaded valve stem to move the throttling sleeve (flow collar) of a flow trim between open and closed positions. However, the rotary stepping actuator has broader application, and may be used to impart rotational stepping motion in fixed angular increments to a threaded stem nut to actuate other types of choke valves, valves or other devices.

Before describing the components of the rotary stepping actuator, the components of a Master Flo prior art surface choke valve (FIG. 7) and a Master Flow prior art subsea choke valve (FIG. 8), will be generally described, with like parts being labelled with the same reference numerals in other of the Figures herein.

Figure 7:
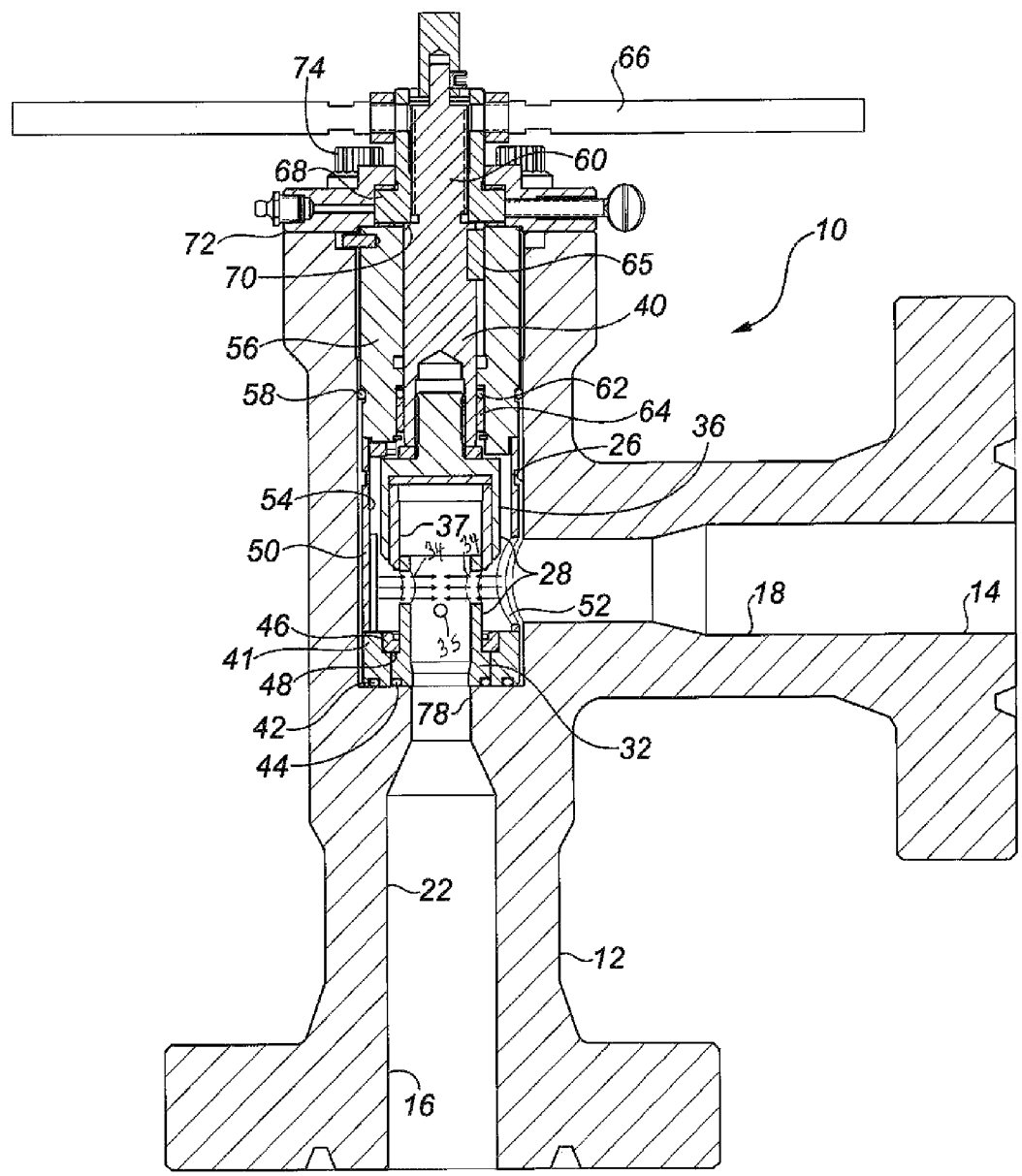
FIGS. 7 and 8 are embodiments of Master Flo prior art surface and subsea choke valves to illustrate the common choke valve components, and to illustrate examples of valve devices which can be adapted for actuation by the rotary stepping actuator of the present invention.
Figure 8:
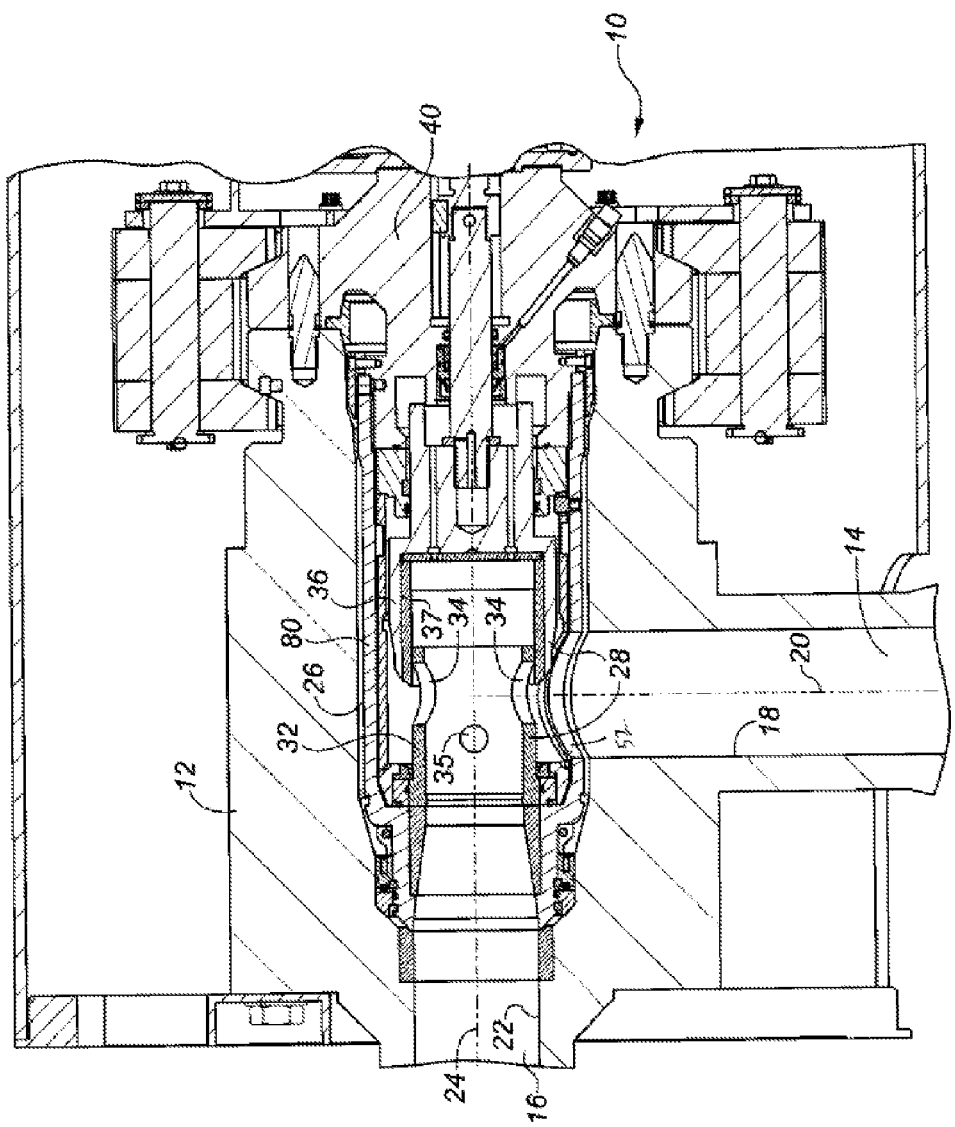

FIGS. 7 and 8 show exemplary surface and subsea choke valves of the prior art which might be adapted for actuation with the rotary stepping actuator of the present invention. However, the invention is not limited to application with these choke valves. The rotary stepping actuator has broad application to other valves, particularly for valves having an externally rising threaded valve stem and a need for linear stepwise actuation of the flow trim.

The flow trim and cage components of the valves shown in FIGS. 7 and 8 may be altered from that shown in the Figures. For example, the cage component may be adapted for use with other known external sleeve inner cage valves, for example cage valves in which the cage component is fitted at or into the outlet of the valve, for example by threading. The cage component may be adapted for use in external sleeve inner cage valves in which the cage component is multi-ported, with a plurality of flow ports (same or differently sized) arranged circumferentially around the ported portion of the cage component. In the description which follows, the cage component is described as being adapted for flow trim of the type shown in FIGS. 7 and 8, however, this description is illustrative only, and the claims which follow should not be interpreted as being limited to these valves.

Figure 2:
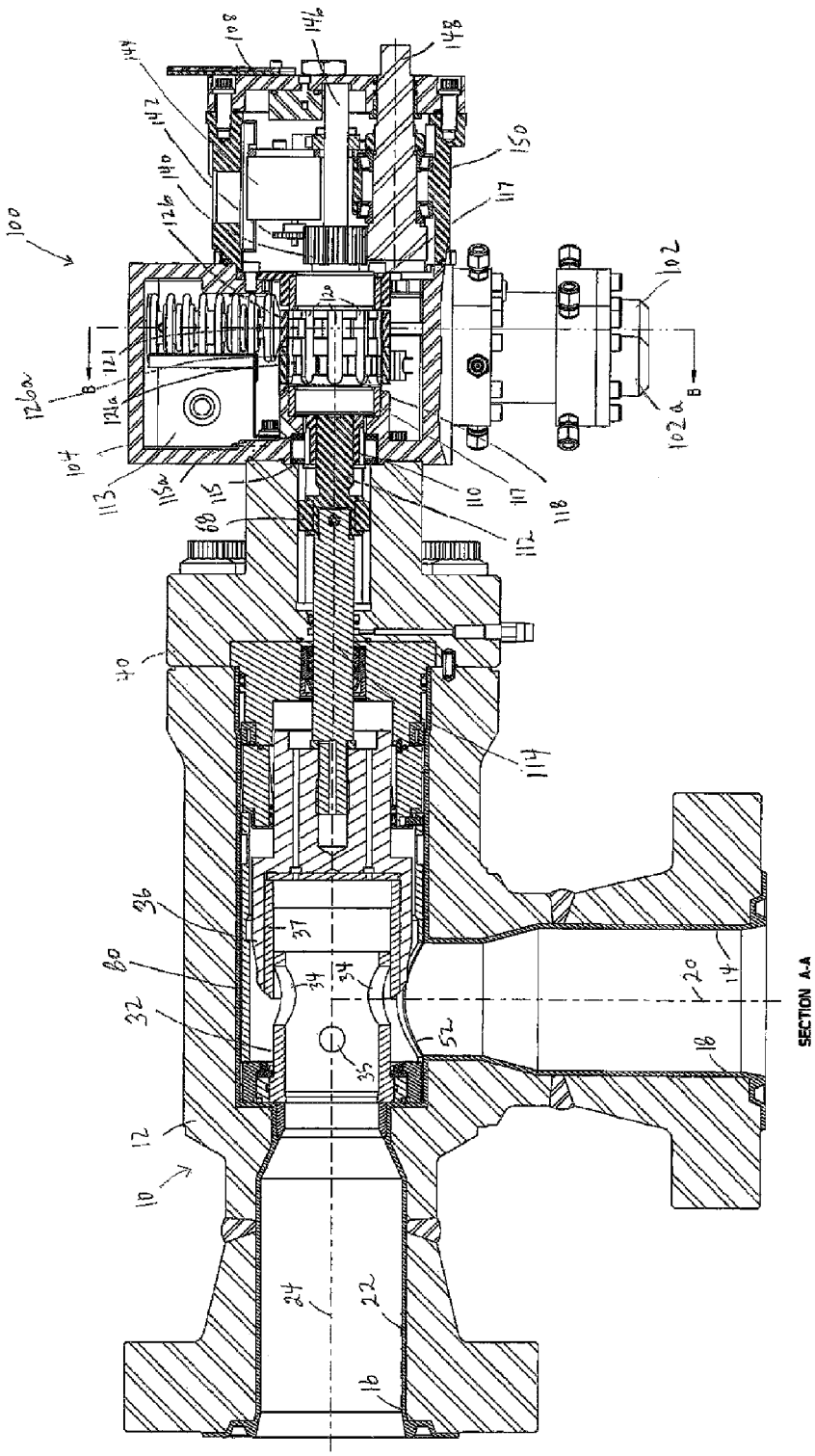
FIG. 2 is a side sectional view taken along line A-A of FIG. 3 showing the subsea rotary stepping actuator of FIG. 1 connected to a stem/bonnet assembly of a Master Flo prior art choke valve.

Each of FIGS. 7 and 8 show a choke valve which is of a external sleeve inner cage valve type. The valve is generally shown at 10, and includes a hollow valve body 12, a body side inlet 14 and a body outlet 16. The hollow valve body 12 forms a bore which extends there through providing side inlet bore 18 having an inlet bore axis 20 (see FIG. 8, center axis), a bottom outlet bore 22 having outlet bore axis 24 (see FIG. 8, center axis). The side inlet bore 18 and the bottom outlet bore 22 intersect at right angles (i.e., are generally T-shaped), forming a main bore 26 at the intersection. The main bore 26 is an extension of the bottom outlet bore 22, but also communicates with the side inlet bore 18. FIG. 2 shows a somewhat similar valve designed for subsea applications, with a removable insert assembly for remote controlled maintenance. While the above main valve parts are common to both valves in FIGS. 1 and 2, the description below is adapted to describe the valve of FIG. 1 in greater detail.

Flow trim components 28 are shown to be located in the main bore 26, including a stationary cage component 32 (herein termed cage) which is tubular and substantially open-ended, and an external throttling cylindrical sleeve (herein also termed flow collar) 36 adapted to slide along the outer side wall of the upstream end of the cage 32. The flow collar 36 is closed at its upper end (upstream end) and typically includes a steel exterior into which is press fit an inner liner 37 formed of hard, erosion resistant material, such as tungsten carbide. The cage 32 has a side wall which forms an internal bore that communicates with, and is substantially aligned with, the outlet bore 22. The side wall of the cage 32 also forms one or more flow ports, shown as being arranged as at least a pair of diametrically opposed main flow ports 34. Alternatively, as noted above, a plurality of circumferentially spaced flow ports may be present. The cage side wall may also be formed with at least a pair of diametrically opposed smaller, secondary flow ports 35. The secondary flow ports 35 have a smaller diameter than that of the main flow ports 34, and are positioned with their axis (i.e., an axis through the midpoint of the ports) rotated or offset by 90° from the axis of the main flow ports 34. The secondary ports 35 are positioned closer to the body outlet 16 than are the main flow ports 34. The main flow ports 34, being larger in diameter, collectively accommodate a majority (i.e., more than 50%) of the fluid flow from the inlet 16. Preferably, the main flow ports 34 are arranged as diametrically opposed pairs, such as 1, 2 or 3 pairs. The main flow ports 34 may be circumferentially spaced and circumferentially aligned on the cage 32 (i.e., the midpoints of the ports 34 are equally spaced in a circle around the circumference of the cage 32). As well, the main flow ports may be located to overlap the intersection of the center axes of the body side inlet 14 and the body outlet 16. As well, at least one pair of the one or more pairs of the diametrically opposed main flow ports may be arranged such that a line through a midpoint of the diametrically opposed main flow ports is parallel to a center axis of the inlet bore.

The flow collar 36 is connected to a stem/bonnet assembly 40 for closing the upper end of the valve body 12 (i.e., the end opposite the outlet 16) and for advancing or withdrawing the flow collar 36 to slide across the ports 34, 35 to close them or open them as described below. The flow trim components 28 are preferably made of an erosion resistant hard material such as tungsten carbide. In FIGS. 7 and 8, the cage 32 is shown as known in the prior art, for example a unitary item formed from tungsten carbide material.

The main bore 26 is formed to be larger in diameter than the outlet bore 22 in order to house, seat and seal the flow trim components 28 therein. A cylindrical seat 41 is positioned at the lower end of the main bore 26, and sealed to the valve body 12 in the main bore 26 with seat seal 42. The stationary cage 32 is held at its lower end within the inner diameter of the seat 41, and carries a cage seal 44 at its lower end to seal to the valve body 12. A seat insert member 46 is seated in the inside diameter of seat 41. This seat insert member 46 is preferably formed of erosion resistant material such as tungsten carbide and serves multiple purposes. The seat insert member 46 protrudes inwardly to the cage 32 above a widened retaining shoulder 48 of the cage 32, thereby retaining the cage 32 within the main bore 26. As well, the seat insert member 46 forms a seat for the flow collar 36, when the flow collar 36 is in the fully closed position covering the main and secondary flow ports 34, 35. A tubular retaining sleeve 50 is preferably positioned in the main bore 26 between the seat 41 and the bonnet 56. The flow trim 28 is positioned within the retaining sleeve 50. The retaining sleeve 50 extends transversely over the inlet bore 18, and has its bore 54 aligned with the outlet axis 24. The sleeve 50 includes at least one sleeve side port 52 into the sleeve bore 54, the side port 52 preferably being aligned with the inlet bore. In alternate embodiments, the sleeve side port 52 and main flow ports 34 may be offset relative to the inlet bore 18 for fracture prevention from debris moving down the inlet, as is described in U.S. Pat. No. 7,426,938 to Bohaychuk et al. In still further embodiments, the tubular retaining sleeve 50 may be omitted and the cage component may be held at or within the outlet bore 22, for example by threading.

The stem/bonnet assembly 40 is shown to include a stationary bonnet member 56 extending into the main bore 26, and carrying bonnet-body seal 58. Housed within the bonnet member 56 is an externally threaded stem member (or stem assembly) 60. The stem 60 and bonnet 56 are sealed though stem-bonnet seal 62 and stem bushing 64. The stem 60 is designed for axial movement, the result of rotational movement of the upper stem nut 68, whose internal threads cooperatively engage the externally threaded section of the stem 60, being initiated for example, by rotating the handle 66 at its upper end. The stem 60 is connected and sealed to the flow collar 36 at its lower end in a known manner to impart translational movement (termed axial movement) to the flow collar 36 for opening and closing the valve 10. Key member 65, positioned between the stem 60 and the bonnet 56, prevents rotational movement of stem 60 within the bonnet 56, while permitting translational movement to be imparted to the flow collar 36. The upward movement of the stem 60, and thus the flow collar 36, is limited when stem shoulder 70 hits the stem nut 68. Alternate stem stop mechanisms may be used to limit upward stem movement to prevent fully uncovering the main flow ports 34, as described in U.S. Pat. No. 8,371,333 issued Feb. 12, 2013 to Bohaychuk. The bonnet 56 is connected at its upper end to bonnet flange 72, which retains the bonnet 56 and closes the upper end of the main bore 26. The flange 72 is bolted to the valve body 12 through cap screws 74. Alternate mechanisms for closing the valve body 12, and for actuating the flow collar 36 for translational movement are well known in the art, such as hydraulic actuators. These actuators might be replaced with the rotary stepping actuator 200 of the present invention, as set out more fully below.

It should be understood that the stem bonnet assembly 40 might include other components for mounting to the rotary stepping actuator of the present invention, such as mounting plates or yokes, as is known in the art. Thus, as described herein and in the claims, the connections or couplings between body members, housings or other components may be direct, or may be indirect through other art known components.

As shown in FIG. 8, the flow trim and stem/bonnet assembly 40 may be positioned as an insert assembly wherein the flow trim 28 is held within a removable tubular cartridge 80 (in place of tubular retaining sleeve 50 of FIG. 7) in the main bore for subsea applications. Further details are shown in the prior art including U.S. Pat. No. 7,426,938 to Bohaychuk et al. or U.S. Pat. No. 4,540,022 to Cove. Hereagain, the actuation of these subsea prior art choke valves might be replaced with the rotary stepping actuator of the present invention, as set out more fully below.

Figure 3:
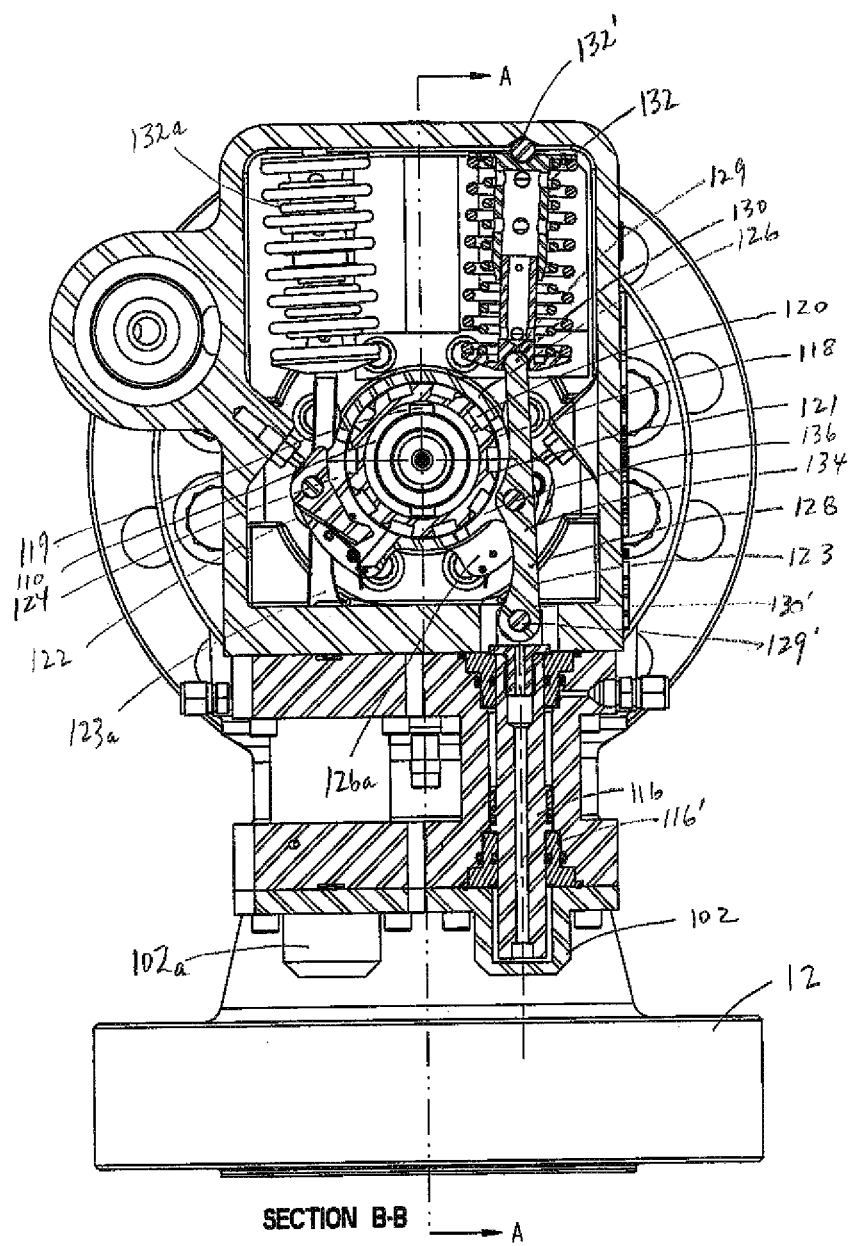
FIG. 3 is a section view taken along line B-B of FIG. 2 showing the actuator components for the rotary stepping actuator of FIGS. 1 and 2.

An embodiment of a Master Flo prior art subsea rotary stepping actuator will now be described with reference to FIGS. 1-3. Reference numerals from FIGS. 7 and 8 are used for the same or similar components in FIGS. 1-3. FIG. 1 shows the rotary stepping actuator 100 separate from the choke valve body and flow trim components and the stem/bonnet assembly. Two hydraulic cylinders 102, 102a are shown extending from the actuator housing 104 of the stepping actuator 100. The cylinders 102, 102a are used to impart rotational stepping motion to actuator components in predetermined, fixed angular increments through to a stem nut 110 (see FIG. 2) in a clockwise or a counterclockwise direction. In one industry standard, this counterclockwise rotational motion is transferred to axial (translational) movement of the threaded valve stem 112 (see FIG. 2) to open the flow trim 28, while a clockwise rotational motion is transferred to axial (translational) movement of the threaded valve stem 112 to close the flow trim 28. In the embodiment of FIGS. 1-3, one hydraulic cylinder 102a is used in the closing operation (clockwise) and one hydraulic cylinder 102 is used in the opening operation (counterclockwise). However, in other embodiments, the directions could be reversed. As well, a single hydraulic cylinder might be used for both directions of actuation. Still alternatively, the hydraulic cylinders might be replaced with pneumatic cylinders.

In the embodiment of FIGS. 1-3, the cylinders 102, 102a impart rotational stepping motion through actuator components in the same predetermined angular increments to the stem nut 110 to move the valve stem 112 the same axial distance in each of the opening and closing direction. FIG. 1 shows an ROV receptacle 106 connected to a top housing 150 which is in turn connected to the actuator housing 104. The ROV receptacle allows for attachment to the ROV. A position indicator 108 is shown with the top housing 150 to indicate the position of the flow trim components. For a subsea choke valve, the actuator housing is commonly filled with a fluid such as a dielectric oil. The stems of the pistons 116 may be hollow, and in fluid communication with the fluid in the actuator housing (best shown in FIG. 3). The cylinders 102, 102a are double acting cylinders in the FIGS. 1-3 to assist in balancing the pressure on both sides of the piston 116. However, single acting cylinders might also be used.

FIG. 2 is a sectional view, lengthwise, along the outlet axis 24 (along line A-A of FIG. 3) of an embodiment of a Master-Flo prior art subsea choke valve showing the actuator housing 104 of the rotary stepping actuator 100 connected to the stem/bonnet assembly 40 of a subsea choke valve 10. The actuator components (described below) of the rotary stepping actuator 100 are rotationally connected to the internally threaded stem nut 110, which in turn is connected to the externally threaded rising valve stem 112 of the choke flow trim 28. As above, this particular embodiment is adapted for a subsea wellhead. In subsea wellheads, maintenance cannot be performed manually. An unmanned, remotely operated vehicle (ROV) is used to approach the wellhead and carry out maintenance functions. In FIG. 2, the ROV receptacle 106 of FIG. 1 is removed to simplify the drawing. To aid in servicing subsea choke valves, the choke valve 10 has the internal components, including the flow trim 28, assembled into a modular sub-assembly (insert assembly) which is inserted into the choke valve body 12 and clamped into position. The particular embodiment shows the flow trim 28 of an external sleeve internal cage design, with an external tubular throttling sleeve (flow collar) 36 that slides over the internal ported tubular cage 32. The flow collar 36 acts to reduce or increase the area of the flow ports 34. The rotary stepping actuator 100 is shown configured to connect to the stem nut 110, and the threaded valve stem 112 is part of a multi-component stem assembly 114. Rotation of the valve stem 112 is prevented by key member 68 (as described above for FIG. 7), so the rotational movement of the stem nut 110 is transferred to axial, translational movement to bias the flow collar 36 back and forth along the external wall of the ported cage 32. The rate that fluid passes through the flow trim 28 is dependent on the relative position of the flow collar 36 on the cage 32 and the amount of port area that is revealed by the flow collar 36. The stem nut 110 and valve stem 112 extend into a stem entry port 115 of the actuator housing 104. The load of the stem nut 110 is supported by thrust bearings 115a at the stem entry port 115.

The connections of each of the valve body 12, the stem/bonnet assembly 40, the actuator housing 104 and the top housing 150 are all pressure containing connections as known in the art. In a subsea choke as shown in FIG. 2, the actuator housing 104 is filled with a fluid such as a dielectric oil. A pressure/volume compensation mechanism for this purpose is shown at 113.

FIG. 3 is a sectional view taken along line B-B of FIG. 2 showing the internal actuator components of the stepping actuator 100 to convert linear movement from hydraulic piston stems 116 into a rotational stepping motion in fixed, predetermined angular increments to be imparted to the stem nut 110, to move the valve stem 112 axially and to move to move the flow collar 36 of the flow trim 28 between open and closed positions. In the prior art rotary stepping actuator 100 of FIGS. 1-3, the increments for stepping are identical in the counterclockwise (opening) and clockwise (closing) directions. For example, fixed angular increments of 36 degrees per step in each of the forward and reverse direction is a typical standard for subsea stepping actuators as shown in FIGS. 1-3. Depending on the threads of the valve stem 112 and the stem nut 110, each 36 degree angular increment, when transmitted to the threaded stem nut 110, typically results in a 0.017 inch axial, translational movement of valve stem 112 and the flow collar 36 along the internal cage 32. This increment of axial movement can be adjusted with the threads of the stem nut 110 and the valve stem 112.

In the stepping actuator 100 of FIGS. 1-3, the angular rotation to the stem nut 110 is accomplished using a slotted tubular drive shaft 118 which is supported for rotation in the actuator housing 104 by bearings 117. The drive shaft 118 is mounted concentrically around the stem nut 110 so as to be co-axially aligned with the stem nut 110. The drive shaft 118 is keyed to the stem nut 110 with one or more keys 119 so as to be rotatably coupled to the stem nut 110.

The slotted drive shaft 118 is shown to be formed with 10 equally spaced, outwardly opening, peripheral slots 120 extending axially along the rotational axis of the drive shaft 118. The slots 120 are matched in number, size and spacing, with the slot spacing being defined by a midpoint to midpoint slot spacing of adjacent slots. For example, in FIG. 2, the slot spacing of the 10 slots 120 around the periphery of the drive shaft 118 is 36°. As best seen in FIG. 2, the slots 120 are arranged in a first slotted circular drive path 121 and a second slotted circular drive path 121a around the periphery of the drive shaft 118, with the first and second drive paths 121, 121a being co-axially spaced from each other along the rotational axis of the drive shaft 118. The slots 120 in the first and second drive paths 121, 121a are co-axially and rotationally aligned with each other. As seen in FIG. 2, the slots 120 are continuous across the first and second drive paths 121, 121a such that the slot openings are co-axially and rotationally aligned in each drive path.

A first actuation assembly 123 and a second actuation assembly 123a are mounted in the actuator housing adjacent the first and second drive paths 121, 121a respectively. Each actuation assembly 123, 123a functions to move from a retracted position out of contact with the slots 120 through a forward (valve opening) or reverse (valve closing) actuation cycle, to releasably engage one of the slots 120 and to incrementally rotate the drive shaft 118 through a predetermined angular increment in a counterclockwise or clockwise direction, when moved through the forward or reverse actuation cycle respectively. In the embodiment of FIGS. 1-3, the first and second actuation assemblies 123, 123a include identical actuation components, except that the components for the reverse actuation cycle of the second drive path 121a are reversed by a 180° rotation. FIG. 3 is a sectional view through the first drive path 121 to show the components of the first actuation assembly 123. Some of the components for the second actuation assembly 123a are visible below the first actuation assembly 123 (into the page in FIG. 3), and these components are labelled with the same reference numerals, but with an added "a".

The first actuation assembly 123 is shown to include a drive collar 126, which is generally annular, and which is mounted co-axially with, and circularly around, the first drive path 121 for rotational counterclockwise and clockwise movement in a radial arc about the first drive path 121. A spring-biassed ratchet pawl 122 is pivotally connected with the drive collar 126 to be pivotally movable between an engaged position within one of the slots 120 and a disengaged position released from the slot 120 with each counterclockwise and clockwise rotation of the drive collar 126. A connecting arm 128, oriented tangentially to the drive collar 126, is pivotally connected at its ends 130, 130' with a pivotal connection 129' to the piston stem 116 of the hydraulic cylinder 102 and with a ball and socket connection 129 to one or more compression springs 132. The compression spring 132 is also connected through a ball and socket connection 132' to the actuator housing 104. The connecting arm 128 has a central portion 134 between its ends 130, 130' which is pivotally connected to the drive collar 126. In this manner, extension of the piston stem 116 causes the connecting arm 128 to impart radial rotational movement to the drive collar 126 in a driven step in the counterclockwise direction to move the ratchet pawl into the engaged position with one of the slots 120 of the drive shaft 118. Retraction of the piston 116 with the compression springs 132 causes the connecting arm 128 to impart radial rotational movement to the drive collar 126 in a return step in an opposite clockwise direction to move the ratchet pawl into the disengaged position released from the slot of the drive shaft 118.

The ratchet pawl 122 is pivotally mounted in an outwardly opening peripheral slot 124 formed in drive collar 126. The connecting arm 128 is pivotally connected at the middle portion 134 in a outwardly opening peripheral slot 136 of the drive collar 126. The ratchet pawl pivotal connection in drive collar peripheral slots 124 is generally diametrically opposite the connecting arm pivotal connection in drive collar peripheral slots 136. The above description refers generally to the actuation components as visible in FIG. 2 for the counterclockwise rotational drive imparted to the drive shaft 118. As above, the same actuation components are used for the clockwise rotational drive imparted to the drive shaft 118 in the second drive path 121a, located axially below the section shown in FIG. 3, however the actuation components are 180 degrees reversed. For those actuation components of the clockwise rotational drive that are visible in FIGS. 2 and 3, like components are labelled with the same reference numerals, but with an added "a" after the reference numeral (example compression springs 132a).

In FIG. 2, the position indicator 108 is shown to be driven from the drive shaft 118 by gears 140, 142 on a gear box 144. A linear variable differential transformer (LVDT) 146 may be included to directly measure the position of the valve stem for accurate electrical feedback of the choke position. Also shown in FIG. 3 is a drive stem 148 of an ROV override mechanism. The components for the position indicator 108, the LVDT 146 and the ROV override mechanism are shown in FIG. 2 to be in a top housing 150 connected to the actuator housing 104.

The actuation components including the drive shaft 118, the drive collar 126, the ratchet pawl 122 are typically formed from carbon steel, or other suitable materials for application in surface or subsea choke valves.

The double acting hydraulic cylinders 102, 102a for a subsea choke valve might use, for example a 3000 or 5000 PSIG hydraulic supply pressure. The hydraulic pressure is used to extend the pistons 116, and the spring force is used to retract. The hydraulic back pressure, caused by the hydraulic fluid head in a supply line (not shown), may be balanced by use of a cross-porting system that connects the vent side of one piston to the supply side of the other. This ensures that the return compression springs 132 function consistently and reliably and that the ratchet pawl 122 which is not engaged (i.e. the idle ratchet pawl) is completely disengaged from the drive shaft 118. The piston stems 116 extend on either side of the pistons, which allows for effective support and guidance of the pistons throughout their motion. As well, a port 116' drilled through the center of the piston stems 116 connects the fluid volume behind the stems 116 to that of the actuator housing 104, ensuring that there is no net change in the actuator housing volume due to the stroking of the pistons.

Based on this description from prior art FIGS. 1-3 and 7-8, the stepping actuator 200 of the present invention will be described in with reference to FIGS. 4-6. For valve components similar to those of FIGS. 7, 8, like reference numerals are used. For components which are the same or similar to that described above for FIGS. 1-3, little additional description is needed, but the reference numerals for like features are increased by 100 in FIGS. 4-6.

Figure 4:
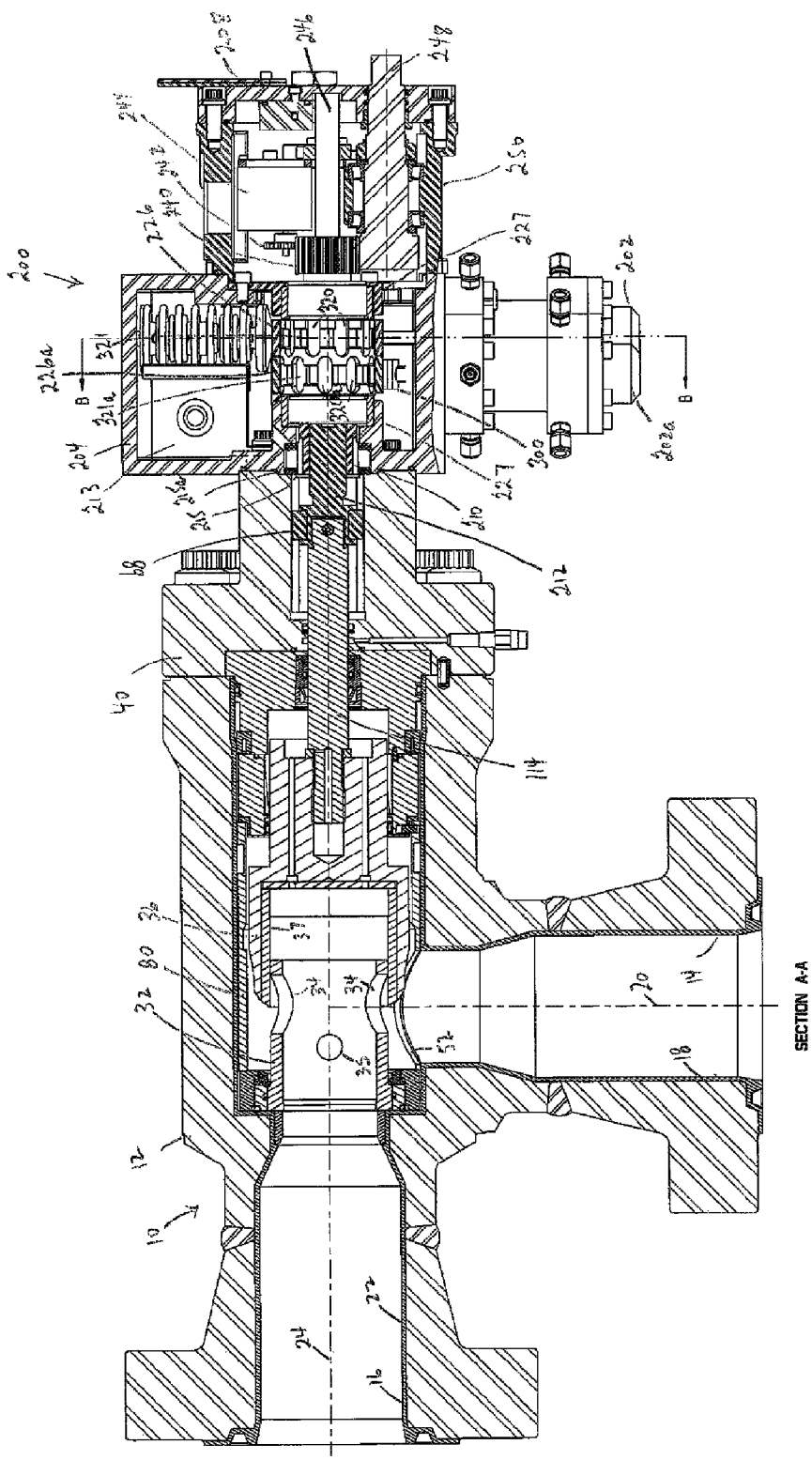
FIG. 4 is a side sectional view of an embodiment of a subsea choke valve according to the present invention, in which the stem/bonnet assembly of the choke valve is connected to an embodiment of a rotary stepping actuator of the present invention, and taken along line A-A of FIG. 5.

The tubular drive shaft component 300 is shown in FIG. 4 to be supported in the actuator housing 204 and coupled to the stem nut 210 as in FIG. 2. However, the drive shaft 300 is altered from drive shaft 118 with a slot offset. The slots 320 formed at a periphery of the drive shaft 300 in a first slotted circular drive path 321 and the slots 320a formed in a second slotted circular drive path 321a co-axially spaced from the first drive path 321 are still matched in number, size and spacing, but the slots 320 in the first drive path 321 are rotationally offset from the slots 320a in the second drive path 321a, based on midpoint to midpoint slot spacing, by a set fraction of the slot spacing. As shown in FIG. 4, the set fraction offset may be about one half of the slot spacing, but a different fraction may be used for the offset, such as one quarter or one third etc.

Figure 5:
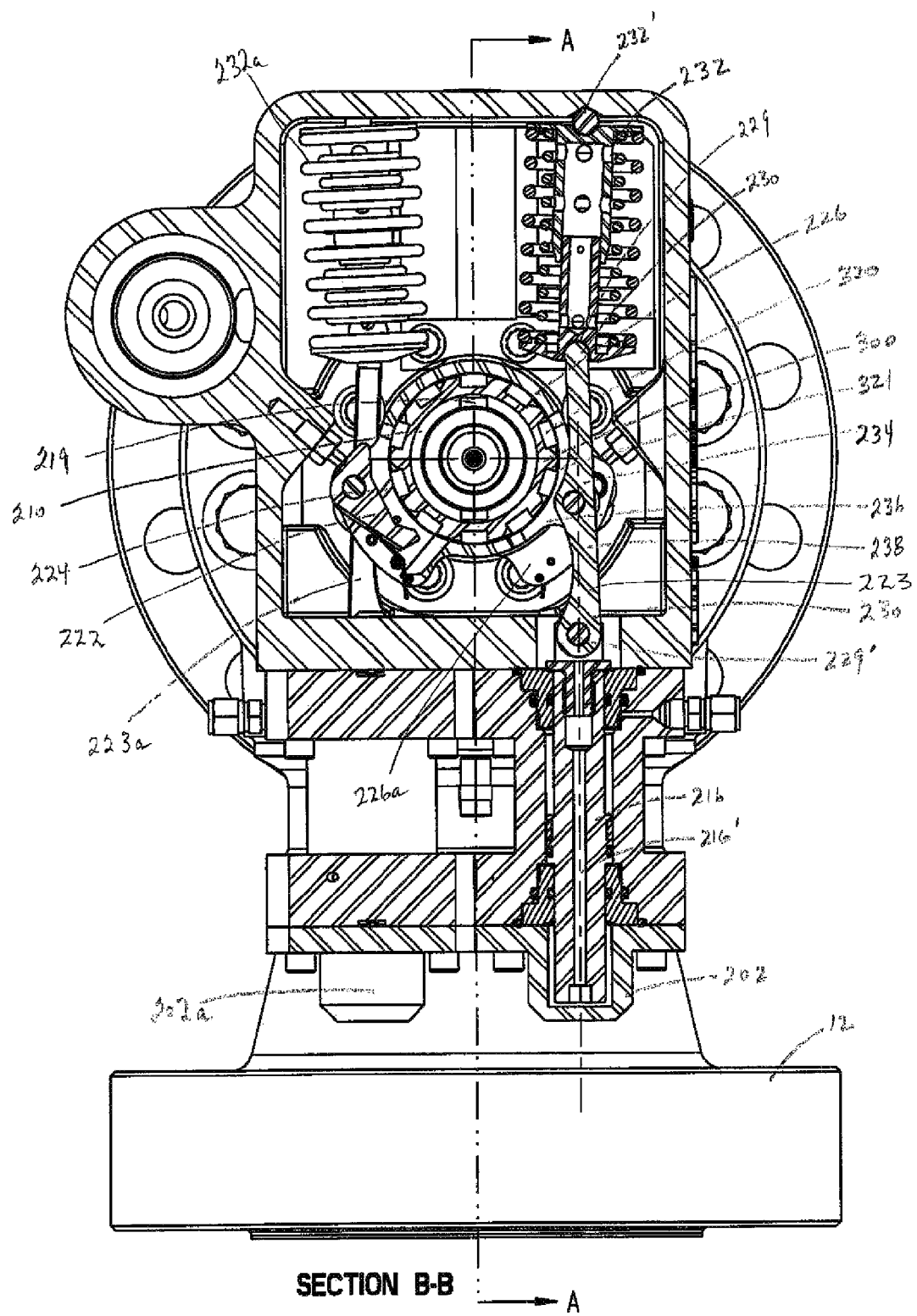
FIG. 5 is sectional view taken along line B-B of FIG. 4 showing the actuator components of the rotary stepping actuator of FIG. 4.

While the slots are shown in FIG. 5 to be generally rectangular when viewed in a cross section perpendicular to the rotational axis of the drive shaft 300, they may have a different shape, for example as the spaces between angled teeth similar to that of a ratchet wheel. The number of slots 320, 320a may be varied as desired for the particular application of the stepping actuator 200. For a choke valve, for example, the number of slots might be between 5 and 15, depending on the predetermined angular increment that is desired for each step of the actuating movement.

The first and second actuation assemblies 223 and 223a are similar to 123 and 123a described above. The predetermined angular increments imparted to the drive shaft 300 in each of the clockwise and counterclockwise rotational directions (i.e., forward and reverse) is angularly matched (here 36° for 10 equally spaced slots). However, the angular increment imparted to the drive shaft 300 for the first forward step directly following a previous reverse step, i.e., a forward counter step in a direction counter to the previous reverse step, is less than the predetermined angular increment by an amount determined by the set fraction due to the offset. For example the counter step may be in an increment that is about one minus the set fraction. Similarly, the angular increment imparted to the drive shaft 300 for the first reverse step directly following a previous forward step, i.e., a reverse counter step in a direction counter to the previous forward step, is less than the predetermined angular increment by an amount determined by the set fraction due to the offset, such as an amount that is one minus the set fraction. Thus, when the set fraction of the offset is about one half, these first steps directly following a previous step in the opposite direction, i.e., counter steps, become half steps (here 18°), while the next following steps in the same counter direction remain full steps in the predetermined angular increment (here 36°). In this manner, the choke valve flow trim 28 may still be opened and closed in the virtually the same number of steps (except for any counter steps or half steps), without adding significant extra time for the opening and closing actions. However, the offset of one half of the slot spacing between the first and second drive paths 321 and 321a allows the flow trim 28 to be forward stepped or reverse stepped by half of the increment of the reverse step or the forward step for finer control over the position of the flow trim 28 in any partially opened or partially closed position.

Figure 6:
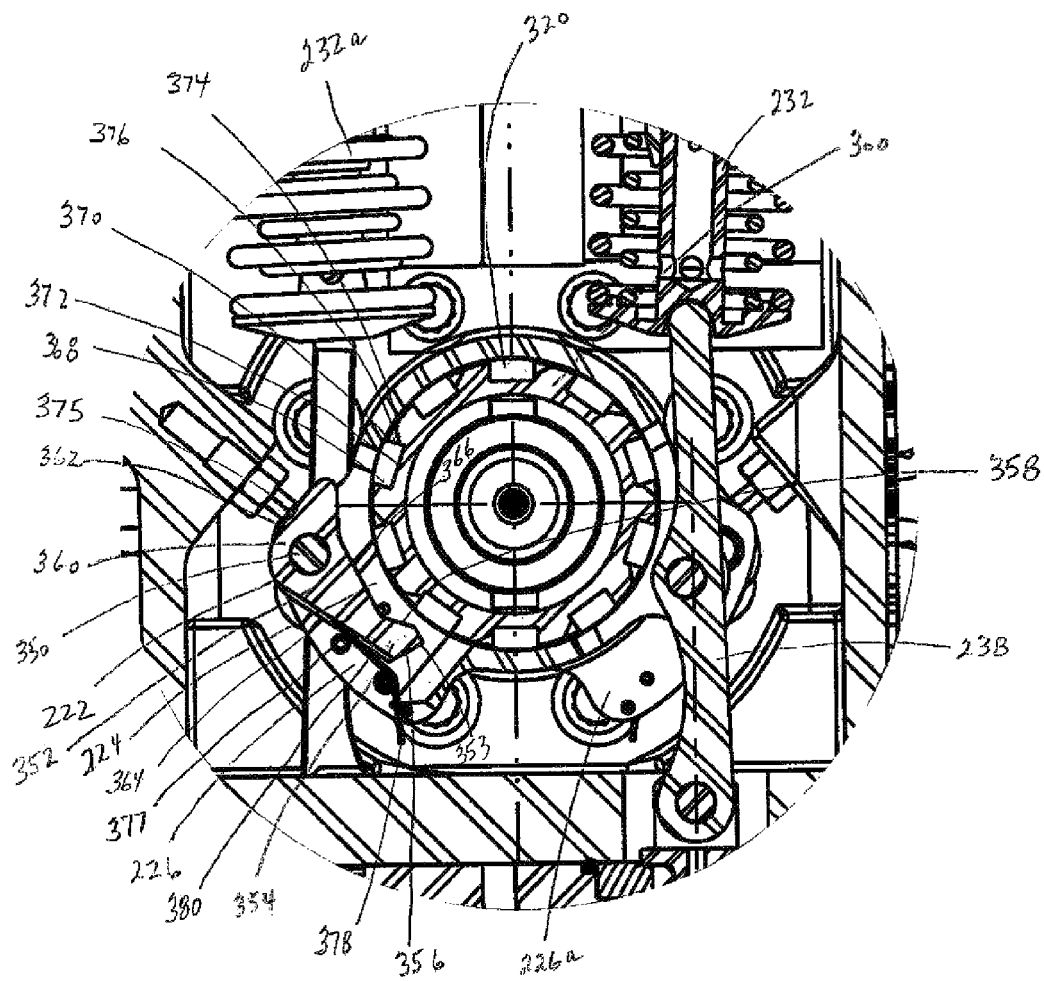
FIG. 6 is an enlarged sectional view of the actuator components of FIG. 5, showing a drive collar, a ratchet pawl, a connecting arm and a slotted drive shaft.

FIG. 6 shows the ratchet pawl 222 and the slots 320 of the first drive path 321 in greater detail. The ratchet pawl 222 is shown with the pivotal connection 350 to the drive collar 226 at a central portion 352 of the pawl 222. A front portion 353 of the pawl 222, forward of the pivot connection 350 forms a notched portion 354 sized to fit into one of the slots 320 of the drive shaft 300. The notched portion 354 has a front drive face 356 and an opposed rear face 358. A back portion 360 of the pawl 222 rearward of the pivotal connection 350 has a back face 362. The central portion 352 of the pawl 222 is also shown to have a top portion 364 facing opposite the drive shaft 300 and a bottom portion 366 facing toward the drive shaft 300. The pivotal connection 350 is shown to be positioned off centre in the pawl 222, more proximate the back face 352.

Due to the offset in the slots 320, 320a, as described above, a first counter step, that is the first forward step or a first reverse step directly following a previous reverse step or a previous forward step respectively, becomes only a half step imparted to the drive shaft. During these counter steps or half steps, the ratchet pawl 222 remains out of engagement with the slot 320 or 320a, and instead engages the periphery of the drive shaft to delay engaging the slot 320 or 320a by the set fraction (here one half) of the predetermined angular increment set by the slot spacing. This delay in engaging the slot 320 or 320a, resulting from the offset, creates these half steps in opposite directions for finer positioning of the flow trim at points between the fully open and the fully closed positions.

Each of the slots 320, when viewed in the cross section of FIG. 6 (perpendicular to the rotational axis of the drive shaft 226) is generally rectangular in cross section, with a front wall 368, a rear wall 370 and a bottom connecting wall 372. During the drive step of the drive collar 226, when the pawl 222 is engaged in the slot 320, the front wall 368 of the slot is engaged with full contact with the front drive face 356 of the ratchet pawl 222 to impart the stepwise rotational movement to the drive shaft 300. During the return step of the drive collar 226, an outer lip 374 of the rear wall 370 of the slot 320 contacts the rear face of the ratchet pawl 222 to move the ratchet pawl 222 into the disengaged position released from the slot 320 so that no movement is imparted to the drive shaft 300. To further assist in full release of the ratchet pawl 222 from the slot 320, the outer lip 374 of the rear wall 370 of the slot 320 has a cut away portion 376. As well, the bottom portion 366 of the pawl 222 may be tapered toward the slot 320 to assist in releasing from the slot 320. The drive collar 226 has a pawl limit pin 377 located at the periphery of the drive collar 226 parallel to the axis of rotation of the drive collar 226 to limit pivotal movement of the pawl 222 in the disengaged position. To spring bias the ratchet pawl 222 into engagement with the slot 320, a torsional spring 378 is mounted at the periphery of the drive collar 226 adapted to press against the top portion 364 of the pawl 222. A groove 380 is formed along the top portion 364 of the pawl 222 to hold the spring in place against the top portion 364 during the travel of the pawl 222.

A locking pin 375 is mounted in the actuator housing so as to contact the back face 362 of the pawl 222 to hold the pawl 222 in the disengaged position against the spring bias of spring 378.

While the drive shaft 300 is described herein as unitary tubular component, it will be understood that the drive shaft could be formed as a split component, for example with a split between the first and second drive paths 321, 321a. For a split drive shaft, each drive shaft component would be fixed, for example by keying, to the stem nut 210. A unitary tubular drive shaft 300 has the advantage of preventing play between the drive shaft 300 and the stem nut 210.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

As used herein and in the claims, the words "comprising", "including" and "having" are used in a non-limiting sense to mean that items following the word in the sentence are included and that items not specifically mentioned are not excluded. The use of the article "a", "an", "the", and "said" in the claims before an element means that one of the elements is specified, but does not specifically exclude others of the elements being present, unless the context clearly requires that there be one and only one of the elements. As well, the use of "top", "bottom", "above", "below", "rear", "front", "back", "forward", "reverse", "clockwise", "counterclockwise" and variations of these or other terms is made for convenience of description relative to component relative positioning in the drawings, but does not require only these particular orientations of the components.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practiced in the absence of any element or elements, limitation or limitations which is not specifically disclosed herein.

The invention claimed is:

1. A valve system comprising:
   (i) a valve body configured with an inlet and an outlet and having flow trim configured to be moved axially by an externally threaded valve stem between a closed position, wherein flow through the valve body is restricted, and an open position, wherein fluid may enter the valve body through the inlet, pass through the flow trim at reduced pressure, and continue through the outlet;
   (ii) a stem/bonnet assembly connected to the valve body and including a bonnet disengagably connected with, and closing, an upper end of the valve body, the threaded valve stem extending through the bonnet, and a stem nut coaxial with the threaded valve stem and having internal threads cooperatively engaged with the externally threaded valve stem;
   (iii) an actuator housing coupled to the stem/bonnet assembly and forming an entry port for sealed entry and rotational mounting of the stem nut;
   (iv) an actuator drive shaft supported in the actuator housing for stepwise rotation in clockwise and counterclockwise directions, the drive shaft being co-axially aligned with, and configured to be rotatably coupled directly or indirectly to, the stem nut to impart rotation to the stem nut, the drive shaft forming at a periphery a first circular drive path and a second circular drive path co-axially spaced from the first drive path, each of the first and second drive paths comprising a number of outwardly-opening, circumferentially-spaced openings, the openings in the first and second drive paths being matched in number, size and spacing, and the openings in the first drive path being rotationally offset from the openings in the second drive path, based on midpoint to midpoint spacing of the openings, by a set fraction of the opening spacing;
   (v) a first actuation assembly mounted in the actuator housing adjacent the first drive path of the drive shaft and moveable from a retracted position through a forward actuation cycle, and operative to releasably engage one of the openings in the first drive path to incrementally rotate the drive shaft in a forward step through a predetermined angular increment set by the opening spacing in the counterclockwise direction when moved through the forward actuation cycle;
   (vi) a second actuation assembly mounted in the actuator housing adjacent the second drive path of the drive shaft and moveable from a retracted position through a reverse actuation cycle, and operative to releasably engage one of the openings in the second drive path to incrementally rotate the drive shaft in a reverse step through the predetermined angular increment in the clockwise direction when moved through the reverse actuation cycle;
   (vii) an actuation control system coupled with the actuator housing and configured to supply a discrete quantity of pressurized fluid to stepwise and separately drive the first and second actuation assemblies to impart stepwise counterclockwise and clockwise rotational movement to the drive shaft in the forward and reverse actuation cycles to move the flow trim in the forward and reverse steps between the open and closed positions; and
   (viii) the drive shaft and the first and second actuation assemblies being adapted to incrementally rotate the drive shaft in a counter step in a direction counter to the direction of a directly preceding step by an amount less than the predetermined angular increment, said amount being determined by the set fraction of the offset, such that the counter step in the counter direction rotates the drive shaft by said amount determined by the set fraction, while a next step in the same counter direction is a full step in the predetermined angular increment.

2. The valve system of claim 1, wherein the drive shaft and the first and second actuation assemblies are adapted to delay engaging the opening in the first and second drive paths in the counter step by the set fraction.

3. The valve system of claim 2, wherein said amount determined by the set fraction of the offset is about one minus the set fraction.

4. The valve system of claim 2, wherein the openings are slots extending axially along the rotational axis.

5. The valve system of claim 4, wherein the set fraction is about one half of the slot spacing, such that the counter step rotates the drive shaft by said amount which is about one half of the predetermined angular increment set by the slot spacing such that the counter step is a half step.

6. The valve system of claim 5, wherein the number of slots in each of the first and second drive paths is between 5 and 20 so that the predetermined angular increment imparted in the full forward step and the full reverse step is between about 18 and 72° and the offset results in the half step being between about 9 and 36°.

7. The valve system of claim 5, wherein the number of slots in each of the first and second drive paths is 10 so that the predetermined angular increment imparted in the full forward step and the full reverse step is about 36° and the offset results in the half step being between about 18°.

8. The valve system of claim 2, wherein:
the actuation control system comprises two hydraulic cylinders connected to the actuator housing, each cylinder having a supply of hydraulic fluid and a piston adapted to extend into the actuator housing; and
the first and second actuation assemblies each comprise:
a drive collar mounted co-axially around either the first drive path or the second drive path for rotational counterclockwise and clockwise movement in a radial arc about the first or second drive path;
the openings in the drive shaft being slots extending axially along the rotational axis;
a ratchet pawl pivotally connected with the drive collar and spring biased to be pivotally movable between an engaged position within one of the slots of the first or second drive paths and a disengaged position released from the slot with each clockwise and counterclockwise rotation of the drive collar; and
a connecting arm oriented tangentially to the drive collar and pivotally connected between the piston of one of the hydraulic cylinders and a compression spring, the connecting arm having a central portion pivotally connected to the drive collar, so that supply of the hydraulic fluid to extend the piston causes the connecting arm to impart radial rotational movement to the drive collar in a driven step in either the clockwise or counterclockwise direction to move the ratchet pawl into the engaged position with one of the slots of the drive shaft, and retraction of the piston with the compression spring causes the connecting arm to impart radial rotational movement to the drive collar in a return step in an opposite clockwise or counterclockwise direction to move the ratchet pawl into the disengaged position released from the slot of the drive shaft.

9. The valve system of claim 8, wherein the ratchet pawl is connected and positioned in the drive collar relative to the drive shaft such that, in the counter step the ratchet pawl remains out of engagement with the slot, and instead engages the periphery of the drive shaft to delay engaging the slot by the set fraction of the predetermined angular increment set by the slot spacing.

10. The valve system of claim 9, wherein the hydraulic cylinder, piston, connecting arm, and ratchet pawl associated with each of the first drive path and second drive path are oriented to engage the drive shaft from diametrically opposite positions to stepwise rotate the drive shaft in opposite clockwise and counterclockwise directions.

11. The valve system of claim 10, wherein:
the valve is a choke valve;
the drive shaft is rotationally coupled to, and co-axially aligned with, the stem nut having internal threads; and
the stem nut is rotationally coupled with the externally threaded valve stem such that the internal threads of the stem nut cooperatively engage the externally threaded valve stem, such that axial rotation of the stem nut produces axial movement of the threaded valve stem to move the flow trim between closed and open positions in accordance with clockwise and counterclockwise rotation of the stem nut.

12. The valve system of claim 11, wherein:
the drive collar is formed with diametrically opposed slotted portions, the connecting arm having a pivotal connection to the drive collar in one slotted portion and the ratchet pawl having a pivotal connection to the drive collar in the diametrically opposed slotted portion;
the ratchet pawl has a central portion which makes the pivotal connection to the drive collar, a front portion forward of the pivotal connection end and a back portion rearward of the pivotal connection, a top portion facing opposite the drive shaft and a bottom portion facing the drive shaft, the front portion forming a notched portion sized to fit into one of the slots of the drive shaft and having a front drive face and an opposed rear face; and
each slot, when viewed in cross section perpendicular to the rotational axis of the drive shaft, has a front wall, a rear wall and a connecting bottom wall, such that during the drive step of the drive collar the front wall of the slot is engaged by the front drive face of the ratchet pawl to impart stepwise rotational movement to the drive shaft, and during the return step of the drive collar an outer lip of the rear wall of the slot contacts the rear face of the ratchet pawl to move the ratchet pawl into the disengaged position released from the slot so that no movement is imparted to the drive shaft.

13. The valve system of claim 12, wherein the rear face of the notched portion of the ratchet pawl is tapered toward the slot to assist in releasing the ratchet pawl from the slot.

14. The valve system of claim 12, further comprising a locking pin mounted in the actuator housing arranged to contact a back face formed on the back portion of the ratchet pawl to hold the ratchet pawl in the disengaged position against the spring bias of the ratchet pawl.

15. The valve system of claim 12, wherein the drive collar has a pawl limit pin at the periphery parallel to the axis of rotation of the drive collar to contact the top portion of the ratchet pawl to limit pivotal movement of the pawl in the disengaged position.

16. The valve system of claim 12, wherein the drive collar comprises a torsional spring at the periphery to press against the top portion of the ratchet pawl to bias the ratchet pawl into engagement with the slot of the drive shaft.

17. The valve system of claim 12, wherein each slot is generally rectangular shaped in a cross section perpendicular to the rotational axis and the outer lip of the rear wall of the slot has a cut away portion to assist in release of the ratchet pawl and to limit wear of the slot and of the ratchet pawl.

18. The valve system of claim 2, wherein the valve body, valve stem and flow trim components are configured in a choke valve comprising:
a hollow valve body assembly having an inlet bore and an outlet bore substantially at right angles, and forming a main bore which is an extension of the outlet bore and which communicates with the inlet bore;
the flow trim positioned in the main bore, the flow trim comprising a stationary tubular cage having a side wall, and an external cylindrical flow collar adapted for sliding movement along the side wall of the cage, the side wall of the cage forming an internal bore aligned with the outlet bore and having a ported portion between its ends formed with one or more flow ports, the external flow collar being adapted for movement between a closed position, wherein the one or more flow ports are fully covered by the external flow collar, and an open position, wherein each of the flow ports is fully or partially uncovered by the external flow collar, whereby fluid may enter the valve through the inlet bore, pass through the one or more flow ports at reduced pressure and continue through the outlet bore;
the bonnet disengagably connected with, and closing, an upper end of the valve body; and
the externally threaded valve stem configured to bias the external flow collar over the one or more flow ports.

19. The valve system of claim 18, wherein the one or more flow ports are arranged to include one or more pairs of diametrically opposed main flow ports.

20. The valve system of claim 19, wherein there is one pair of diametrically opposed main flow ports.

21. The valve system of claim 18, which further comprises a tubular sleeve positioned in the main bore across the inlet bore and forming at least one side port communicating with the inlet bore, the flow trim being positioned within the tubular sleeve, and wherein the bonnet closes the upper end of both the valve body and the tubular sleeve.

22. The valve system of claim 21, wherein the at least one side port is aligned with the inlet bore, and one pair of the one or more pairs of the diametrically opposed main flow ports is arranged such that a line through a midpoint of the diametrically opposed main flow ports is parallel to a centre axis of the inlet bore.

23. The valve system of claim 22, further comprising:
at least a pair of diametrically opposed secondary flow ports formed in the side wall of the cage, the secondary flow ports having a smaller diameter than a diameter of the main flow ports and each pair of secondary flow ports being positioned with an axis which is offset by 90° from the axis of one of the pairs of main flow ports and closer to the body outlet than are the main flow ports.

24. The valve system of claim 21, wherein:
the inlet bore and the outlet bore are arranged in a T-shape to provide a body side inlet, a body outlet and an insert chamber at the intersection of the body side inlet and the body outlet; and
the tubular sleeve and the flow trim are arranged as a removable insert assembly positioned in the insert chamber, the insert assembly comprising:
a) the tubular sleeve being adapted as a tubular cartridge having a side wall forming an internal bore and the at least one side port communicating with the body side inlet, whereby fluid may enter through the at least one side port from the body side inlet;
b) the flow trim being positioned in the cartridge internal bore, the flow trim comprising the tubular cage aligned with the body outlet, and the external flow collar slidable along the side wall of the cage, the cage side wall forming the one or more pairs of diametrically opposed main flow ports located to overlap the intersection of the axes of the body side inlet and the body outlet, and aligned with the at least one side port of the tubular cartridge to communicate with the side port, whereby fluid from the body side inlet may enter the cage bore at reduced pressure and pass through the body outlet;
c) the bonnet being disengagably connected with, and closing, the upper end of the tubular cartridge and the body; and
d) the externally threaded valve stem being configured to bias the flow collar over the main flow ports.

25. The valve system of claim 24, further comprising:
at least a pair of diametrically opposed secondary flow ports formed in the side wall of the cage, the secondary flow ports having a smaller diameter than a diameter of the main flow ports and each pair of secondary flow ports being positioned with an axis which is offset by 90° from the axis of one of the pairs of main flow ports and the secondary flow ports being arranged closer to the body outlet than are the main flow ports.

26. A drive shaft component as defined in claim 1.

27. A rotary stepping actuator comprising the components (iii)-(viii) of claim 1.

28. A method of opening and closing the flow trim of a valve with a rotary stepping actuator by imparting stepwise rotation in predetermined angular increments in clockwise and counterclockwise directions to a drive shaft rotationally coupled to the flow trim through a stem nut and a valve stem in a manner to impart axial movement to the flow trim with each stepwise rotation of the drive shaft, the method comprising:
supplying pressurized fluid to stepwise and separately drive first and second actuation assemblies to impart stepwise counterclockwise and clockwise rotational movement to the drive shaft such that the drive shaft is stepwise rotated by a predetermined angular increment for each forward step and each reverse step to move the flow trim axially in steps between an open position and a closed position;
incrementally rotating the drive shaft in a counter step in a direction counter to the direction of a directly preceding forward or reverse step by an amount less than the predetermined angular increment; and
incrementally rotating the drive shaft in a next step in the same counter direction by the predetermined angular increment.

29. The method of claim 28, wherein the counter step incrementally rotates the drive shaft by about half of the predetermined angular increment.

* * * * *